US009159124B2

United States Patent
Goshen et al.

(10) Patent No.: US 9,159,124 B2
(45) Date of Patent: Oct. 13, 2015

(54) CONTRAST TO NOISE RATIO (CNR) ENHANCER

(75) Inventors: Liran Goshen, Pardes-Hanna (IL); Asher Gringauz, Nesher (IL); Yechiel Lamash, Haifa (IL); Andrei Feldman, Haifa (IL); Guido Pardo-Roques, Haifa (IL); Jonathan Sapir, Tivon (IL)

(73) Assignee: Koninklijke Philips N.V., Eindhoven (NL)

( * ) Notice: Subject to any disclaimer, the term of this patent is extended or adjusted under 35 U.S.C. 154(b) by 166 days.

(21) Appl. No.: 13/989,158

(22) PCT Filed: Nov. 16, 2011

(86) PCT No.: PCT/IB2011/055122
§ 371 (c)(1),
(2), (4) Date: May 23, 2013

(87) PCT Pub. No.: WO2012/073140
PCT Pub. Date: Jun. 7, 2012

(65) Prior Publication Data
US 2013/0243348 A1 Sep. 19, 2013

Related U.S. Application Data

(60) Provisional application No. 61/418,422, filed on Dec. 1, 2010.

(51) Int. Cl.
*G06K 9/40* (2006.01)
*G06T 5/00* (2006.01)
*G06T 5/20* (2006.01)

(52) U.S. Cl.
CPC .................. *G06T 5/007* (2013.01); *G06T 5/002* (2013.01); *G06T 5/20* (2013.01)

(58) Field of Classification Search
None
See application file for complete search history.

(56) References Cited

U.S. PATENT DOCUMENTS

| 6,466,687 | B1 * | 10/2002 | Uppaluri et al. | 382/128 |
| 6,512,807 | B1 * | 1/2003 | Pohlman et al. | 378/4 |
| 7,203,353 | B2 * | 4/2007 | Klotz et al. | 382/131 |
| 2007/0263915 | A1 * | 11/2007 | Mashiach | 382/130 |
| 2009/0002562 | A1 * | 1/2009 | Yokoyama et al. | 348/673 |
| 2009/0226057 | A1 * | 9/2009 | Mashiach et al. | 382/128 |

(Continued)

OTHER PUBLICATIONS

Alvino, C.V.; Yezzi, A.J., "Tomographic reconstruction of piecewise smooth images," Computer Vision and Pattern Recognition, 2004. CVPR 2004. Proceedings of the 2004 IEEE Computer Society Conference on , vol. 1, no., pp. I-576,I-581 vol. 1, Jun.27-Jul. 2, 2004.*

(Continued)

*Primary Examiner* — Andrae S Allison (57) ABSTRACT

A method includes enhancing a contrast to noise ratio (CNR) of image data, generating CNR enhanced image data, wherein the CNR enhanced image data has a substantially same image quality as the image data. A computing system (118) includes a computer readable storage medium (122) encoded with computer readable instructions for enhancing a contrast to noise ratio (CNR) of image data and one or more processors (120), which, when executing the computer readable instructions, causes the computing system to enhance the CNR of the image data. A method includes generating CNR enhanced image data, wherein CNR enhanced image data has a substantially same noise level, noise power spectrum, and spatial resolution of the image data.

25 Claims, 5 Drawing Sheets

(56) References Cited

U.S. PATENT DOCUMENTS

2010/0014628 A1* 1/2010 Kadomura et al. .............. 378/4
2012/0224760 A1* 9/2012 Goshen et al. .............. 382/131

OTHER PUBLICATIONS

Barrett, B. J., et al.; Preventing Nephropathy Induced by Contrast Medium; 2006; N. Engl. J. Med.; 354:379-386.

Comaniciu, D., et al.; Mean Shift: A Robust Approach toward Feature Space Analysis; 2002; IEEE PAMI; pp. 1-37.

Katzberg, R. W., et al.; Contrast-induced nephrotoxicity: Clinical landscape; 2006; Kidney International; 69:S3-S7.

Kump, K. S., et al.; Digital subtraction peripheral angiography using image stacking: initial clinical results; 2001; Med. Phys.; 28(7)1482-1492.

Perona, P., et al.; Scale-Space and Edge Detection Using Anisotropic Diffusion; 1990; IEEE Trans. on Pattern Analysis and Machine Intelligence; 12(7)629-639.

Rudin, L. I., et al.; Nonlinear total variation based noise removal algorithms; 1992; Physica D; 60:259-268.

Teague, S. D., et al.; Potential clinical and economic benefits of low-contrast-dose CT angiography; 2009; Applied Radiology; 38(3)6 pages.

Tepel, M., et al.; Contrast-induced Nephropathy: A Clinical and Evidence-Based Approach; 2006; Circulation; 113:1799-1806.

Tomasi, C., et al.; Bilateral Filtering for Gray and Color Images; 1998; IEEE Trans. on Computer Vision (ICCV); 8 pages.

Wunderlich, A., et al.; Image Covariance and Lesion Detectability in Direct Fan-Beam X-Ray Computed Tomography; 2008; Phys. Med. Biol.; 53(10)2471-2493.

\* cited by examiner

CONTRAST TO NOISE RATIO (CNR) ENHANCER

CROSS REFERENCE TO RELATED APPLICATIONS

This application is a national filing of PCT application Serial No. PCT/IB2011/055122, filed Nov. 16, 2011, published as WO 2012/073140 A1 on Jun. 7, 2012, which claims the benefit of U.S. provisional application Ser. No. 61/418, 422 filed Dec. 1, 2010, which is incorporated herein by reference.

FIELD OF THE INVENTION

The following generally relates to imaging and more particularly to enhancing the contrast to noise ratio (CNR) of an image and is described with particular application to computed tomography (CT); however, the following is also amenable to other imaging modalities such as positron emission tomography (PET), single photon-emission tomography (SPECT), magnetic resonance imaging (MRI), x-ray radiology, and/or other imaging modalities.

BACKGROUND OF THE INVENTION

A computed tomography (CT) scanner includes an x-ray tube that emits radiation that traverses an examination region and a portion of an object or subject therein. A detector detects radiation traversing the examination region and generates projection data indicative of the detected radiation. A reconstructor reconstructs the projection data and generates volumetric image data indicative of the portion of the object or subject in the examination region.

Contrast media (e.g., iodinated agents) has been administered prior to scanning (a contrast enhanced scan) to improve tissue visualization during routine diagnostic imaging studies by CT, angiography, fluoroscopy, MRI and many other imaging modalities, interventional clinical procedures, therapeutic procedures such as percutaneous transluminal coronary angioplasty (PTCA), etc., and/or imaging procedures. The literature has indicated tens of millions of radiologic examinations using iodinate contrast media are performed each year.

Generally, a large volume of contrast media results in higher contrast to noise ratio (CNR) images, while a lower volume of the contrast media leads to lower CNR images. Unfortunately, as the contrast media volume increases, so does its associated risks. By way of example, after parenteral administration of a contrast media, many patients experience idiosyncratic effects, such as warmth, nausea, itching and other types of effects. Certain patients may experience severe and potentially life-threatening allergic reactions to contrast media. Contrast media may also induce kidney damage (contrast Induced Nephropathy (CIN)) as some patients may develop an acute deterioration of their kidney function due to the fact that iodinated contrast media is cleared via the kidneys.

As the amount of contrast media delivered to a patient is a concern, a set of technological enablers have been developed to reduce contrast media usage. Examples of such enablers include electronically controlled injection devices, high rate chaser saline, faster rotation time, wider coverage area, bolus tracking software and the use of low kV protocols. Furthermore, non-ionic and low osmolar agents have been developed, which are better tolerated by patients with regard to idiosyncratic effects, but generally are more expensive. However, there is an unresolved need for novel and non-obvious approaches that facilitate reducing the amount of contrast media utilized for scanning patients while providing diagnostic quality images.

SUMMARY OF THE INVENTION

Aspects of the present application address the above-referenced matters and others.

According to one aspect, a method includes enhancing a contrast to noise ratio (CNR) of image data, generating CNR enhanced image data, wherein the CNR enhanced image data has a substantially same image quality as the image data.

According to another aspect, a computing system includes a computer readable storage medium encoded with computer readable instructions for enhancing a contrast to noise ratio (CNR) of image data and one or more processors, which, when executing the computer readable instructions, causes the computing system to enhance the CNR of the image data.

According to another aspect, a method includes generating CNR enhanced image data, wherein CNR enhanced image data has a substantially same noise level, noise power spectrum, and spatial resolution of the image data.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

The following relates to facilitating reducing the amount of contrast media utilized for a given contrast enhanced imaging procedure, while preserving image quality to be as close as possible to a corresponding full contrast media volume scan. The imaging procedure can be any imaging procedure in which contrast media is utilized such an imaging performed with an imaging modality such as computed tomography (CT), positron emission tomography (PET), single photon emission tomography (SPECT), magnetic resonance imaging (MRI), x-ray radiography, and/or other imaging modalities. However, for sake of brevity and explanatory purposes, the following is discussed in connection with a CT scanner.

Figure 1:
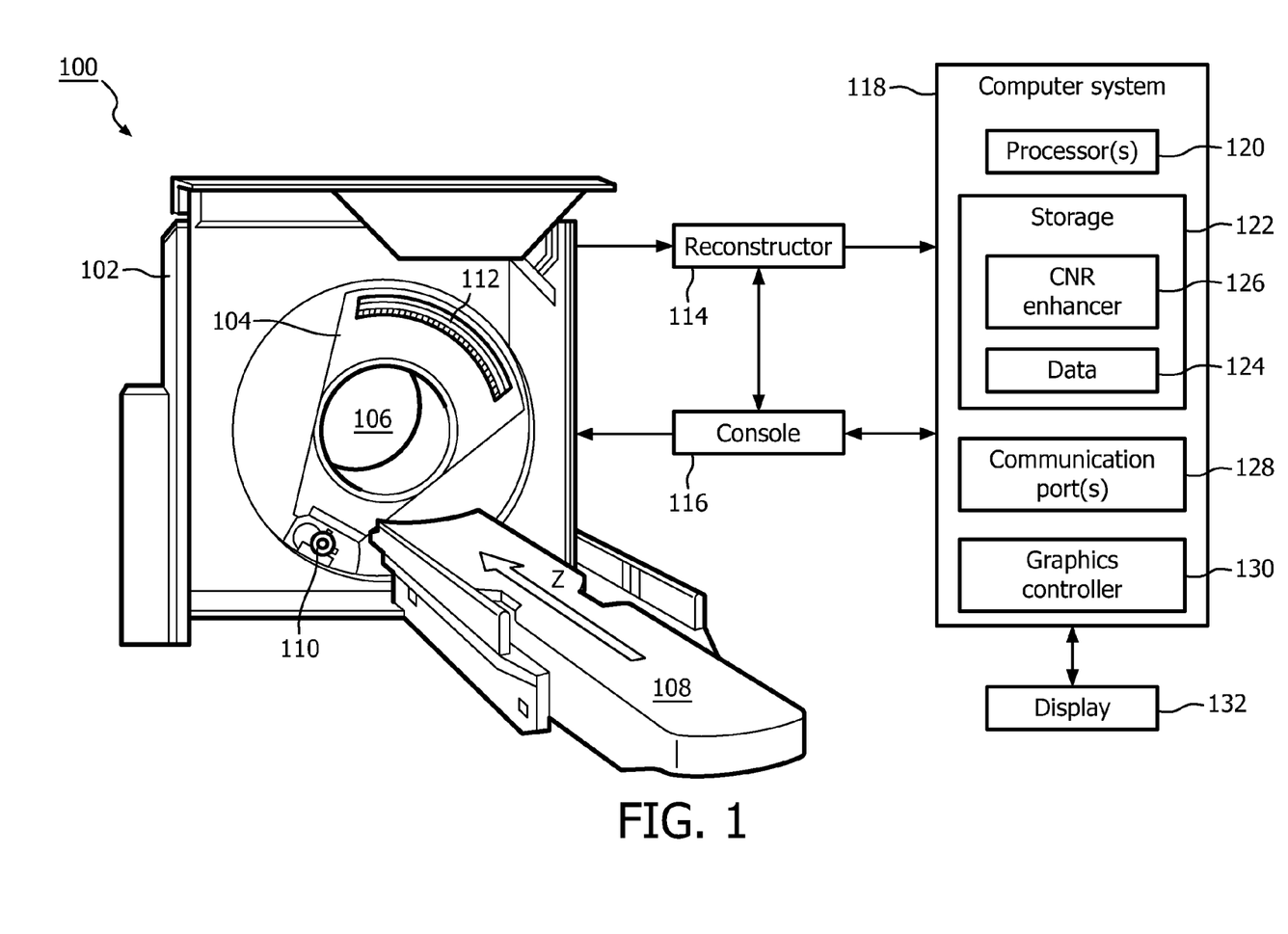
FIG. 1 illustrates an imaging system in connection with an image data contrast to noise ratio (CNR) enhancer.

FIG. 1 illustrates an imaging system such as a computed tomography (CT) scanner 100.

The scanner 100 includes a stationary gantry 102 and a rotating gantry 104, which is rotatably supported by the stationary gantry 102. The rotating gantry 104 rotates around an examination region 106 about a longitudinal or z-axis. A patient support 108, such as a couch, supports a patient in the examination region 106 and is movable along the z-axis in coordination with the rotation of the rotating gantry 104 to facilitate helical, axial, or other desired scanning trajectories.

A radiation source 110, such as an x-ray tube, is supported by and rotates with the rotating gantry 104 around the examination region 106. The radiation source 110 emits radiation that is collimated by a source collimator to produce a generally fan, wedge, or cone shaped radiation beam that traverses the examination region 106. A radiation sensitive detector array 112 detects radiation that traverses the examination region 106 and generates projection data indicative of the detected radiation.

A reconstructor 114 reconstructs the projection data and generates volumetric image data indicative of the examination region 106. A general purpose computing system serves as an operator console 116, and includes an output device such as a display and an input device such as a keyboard, mouse, and/or the like. Software resident on the console 116 allows the operator to control the operation of the system 100, for example, allowing the operator to initiate scanning, etc.

A computing system 118 such as a workstation, a computer, or the like is configured to process the image data. The computing system 118 includes one or more processors 120 and computer readable storage medium 122 (e.g., physical memory) encoded or embedded with computer readable instructions (e.g., software programs), which, when executed by the one or more processors 120 cause the computing system 118 to carry out various functions. The storage medium 122 also stores data 124.

Such instructions include instructions for implementing a contrast to noise ratio (CNR) enhancer 126. As described in greater detail below, the CNR enhancer 126, when executed by the processor(s) 120, enhances the CNR of image data such as image data generated by the reconstructor 114 or otherwise. Such enhancement allows for a reduction in the volume of contrast media administered to a patient for an imaging procedure (e.g., 80%), while achieving the image quality that would have been maintained with the prescribed volume of contrast media without employing the CNR enhancer 126.

In one embodiment, the instructions invoke visual presentation of an interactive graphical user interface (GUI) with which a clinician can interact with to, among other things, specify a reduction amount of the contrast media for a specific scan, wherein the CNR enhancer 126 compensates for the specified reduction. The GUI can also be utilized as a tool for structure enhancement and/or image probing. In this instance, the clinician can tweak the one or more parameters to probe the images and/or to obtain the required and/or desired visualization results.

Additionally or alternatively, the CNR enhancer 126 can be used to enhance CNR for imaging procedures in which the contrast media injection timing was missed, which may mitigate having to administer another volume of contrast media and/or perform another scan. Additionally or alternatively, the CNR enhancer 126 can be used to enhance CNR while preserving a noise level and/or a noise power spectrum (NPS) for studies involving soft tissue differentiating, brain gray-white matter differentiation, and/or other low contrast structure differentiation.

One or more communication ports 128 are configured for communication with one or more input devices (e.g., a keyboard, a mouse, and the like), one or more output devices (e.g., a display, a printer, etc.), one or more apparatuses (e.g., a computing system, portable storage, etc.), one or more data repositories, the system 100 (e.g., the console 116 and/or the reconstructor 114), etc. A graphics controller 130 processes data for presentation on a monitor, such as a display 132, in a human readable format.

Although the storage medium 122 is showed as a single component, it is to be understood that the storage medium 122 may include a plurality of storage units, including storage local to the computing system 118 and/or storage external from the computing system 118. Likewise, the processors 120 may be distributed across different computing systems. Furthermore, the computing system 118 may be part of the console 116, or vice versa, or located remote from the system 100. Moreover, the one or more processors 120 may additionally or alternatively execute instructions carried by transitory medium such as a signal or wave carrier.

Figure 2:
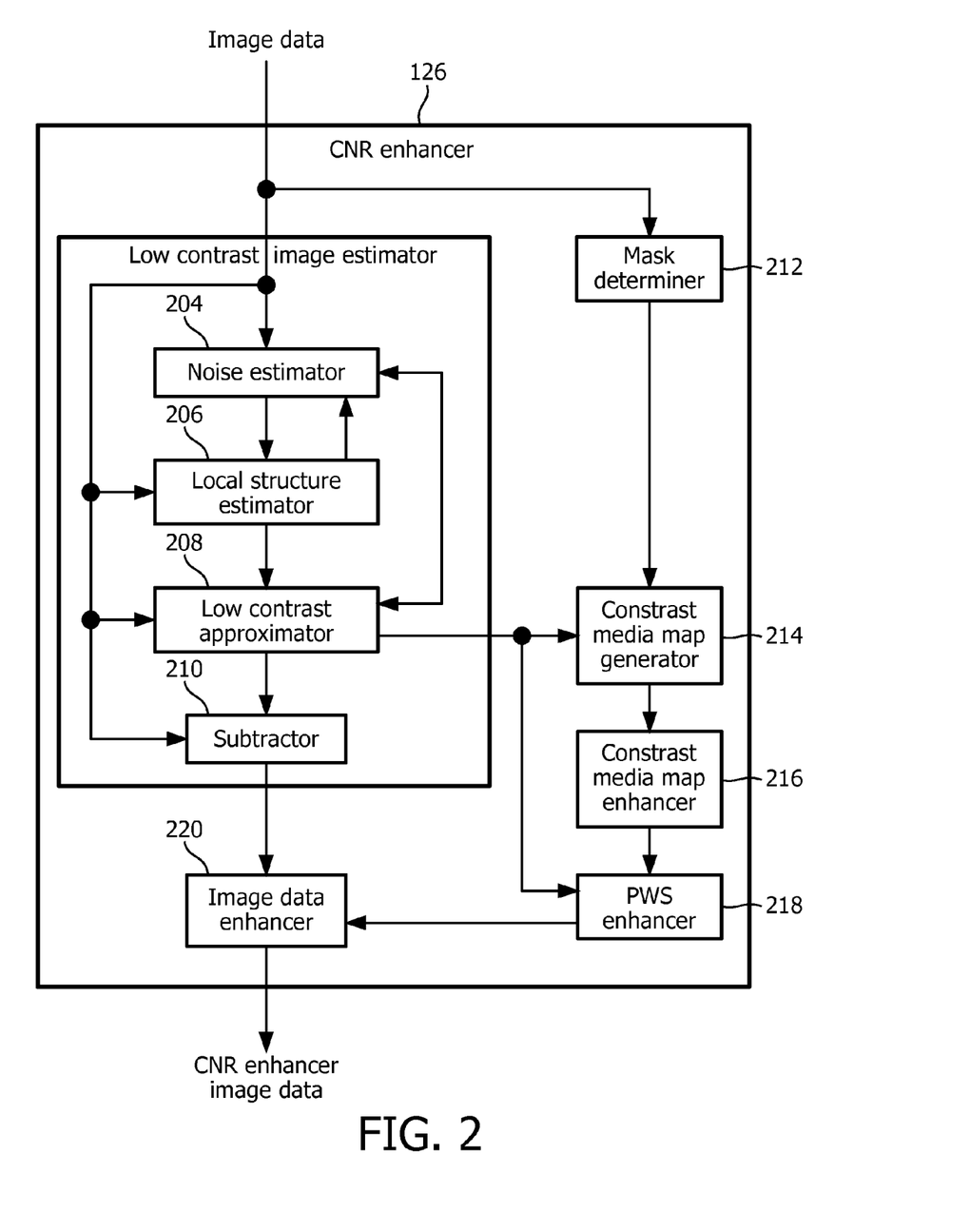
FIG. 2 shows an example of the CNR enhancer.

FIG. 2 illustrates an example of the CNR enhancer 126, which processes image data and generates CNR enhanced image data.

The CNR enhancer 126 includes a low contrast image estimator 202, which has high sensitivity to low contrast structures and preserves very accurately low contrast structures, preserving the Hounsfield Unit (HU)/intensity values of low contrast regions. The illustrated low contrast image estimator 202 includes a noise estimator 204, a local structure estimator 206, a low contrast approximator 208, and a subtractor 210.

The noise estimator 204 evaluates the image data and determines an estimate of a noise pattern (e.g., a noise model) in the image data. Various known approaches can be used to estimate the noise pattern. Examples of suitable approaches include a Monte Carlo estimate, an analytical estimate, an image based estimate, and/or other approach.

The local structure estimator 206 estimates local structure having improved CNR, for example, by differentiating between the noise layer and the underlying study structures based on the determined noise pattern. Various known approaches can be used to estimate local structure. Examples of suitable approaches include bilateral filtering, diffusion filtering, total variation de-noising, mean shift filter, and/or other approach.

Note that the above-listed approaches are good for noise removal and have the capability to improve significantly the local CNRs, but they do not have high sensitivity and high capability to preserve the intensity values of low contrast regions, especially in the presence of high noise.

The low contrast approximator 208 generates a piece-wise smoothed (PWS) approximation. In one non-limiting instance, this is done over the original image data using the local structures estimated by the local structure estimator 206 and the noise model estimated by the noise estimator 204. The estimated local structure is very well defined and has improved CNR. In addition, since this is performed over the original image data, the intensity values of low contrast regions are preserved very accurately.

An optional variant is to generate a new noise model, in alternative to the noise model estimated by the noise estimator 204. The new noise model is estimated based on the local structure estimate estimated by the local structure estimator 206.

Various known approaches can be used to generate the PWS approximation. Examples of suitable approaches include approaches mean shift filtering, bilateral filtering, diffusion filter, and/or other approach that can generate the PWS approximation based on input local structure estimate and a local noise model.

With the mean shift algorithm, the kernel is set by a bandwidth parameter and distances between the current pixel value and its neighborhood. The local bandwidth parameter defines the sensitivity of the algorithm to the signal level and can be set as function of the local noise level.

The distances between the processed pixel properties and the neighborhood defines the spatial relation between the pixels, i.e., defines the local structure. In this example, these distances are set according to the distances in the local structure estimate with the enhanced local CNR, and are used to generate the PWS approximation.

In an optional variant, the PWS approximation is determined using an iterative algorithm in which the output of each iteration is used to refine the noise model and the local structure estimate, which may lead to a more accurate PWS approximation.

The output of the low contrast image estimator 202 is the PWS approximation and a complement PWS part of the image data, which is determined based on the input image data and the PWS approximation, for example, by subtracting the PWS approximation from the input image data, via the subtractor 210. The complementary PWS part includes mostly noise, artifacts and/or small-scale repeated details.

The mask determiner 212 determines a mask based on the image data. In this example, the mask determiner 212 identifies and segments bone structure in the image data, and the segmented bone is utilized to produce a bone mask over the entire or a predetermined portion of entire study. Various known approaches can be used to segment the bone structure. Examples of suitable approaches include morphological, atlas based, model based, and/or other approaches.

A contrast media map estimator 214 estimates a contrast media (CM) map ($CM_{map}$) based on the bone mask and the PWS approximation. The CM map generally is a map in HU unit that presents the changes in HU due to the presence of CM. In this example, the CM map is approximated based on a comparison of the PWS approximation values with a reference value that represents a typical soft tissue value in the image data.

The narrow dynamic range of soft tissue facilitates the estimate and guarantees a relatively low estimate error. In addition, the bone mask is utilized to prevent a fault estimate of contrast media within bone regions.

A contrast media map enhancer 216 enhances the contrast media regions of the map to compensate for any reduced contrast media volume. In this example, the contrast media enhancer 216, based on the linear relationship between contrast media concentration and the HU in the image data, compensate the contrast media regions based on EQUATION 1:

$$CM_{map}^+ = (\alpha-1)CM_{map}, \quad \text{EQUATION 1}$$

wherein $CM_{map}^+$ represents the enhancement contrast media map (i.e., the amount of enhancement for each pixel) and $\alpha$ represents an enhancement multiplier parameter.

Generally, the parameter $\alpha$ is determined as the reciprocal of the amount of contrast media reduction. By way of example, where the volume of contrast media is reduce 50%, the parameter $\alpha$ is set to two (2) (i.e., 1/0.5). Using this setting, the CNR will be very similar to a corresponding full contrast media volume study.

In an optional variant, the contrast media map enhancer 216 has the capability to restrict the amount of enhancement. This restriction capability allows to improve the robustness in different scenarios such as an erroneous setting for the parameter $\alpha$, restriction of calcification partial volume effect (PVE) enhancement, cases of applying the algorithm on full contrast media volume studies, etc.

For this variant, the contrast media enhancer 216 compensates the contrast media regions based on EQUATION 2:

$$CM_{map}^+ = \begin{cases} (\alpha-1)CM_{map}, & CM_{map} \leq \omega \\ & CM_{map} > \omega \text{ and} \\ (\alpha-1)\omega - \beta(CM_{map} - \omega), & CM_{map} < \omega\left(1 + \frac{\alpha-1}{\beta}\right), \end{cases} \quad \text{EQUATION 2}$$

wherein $\omega$ represents the range width of the enhancement and $\beta$ represents the decreasing enhancement rate that is applied above the enhancement range width $\omega$. Note that for $$CM_{map} \geq \omega\left(1 + \frac{\alpha-1}{\beta}\right),$$

no enhancement is performed.

As an alternative to the above parameter $\omega$, an upper HU threshold for enhancement can be used. The upper threshold can be either set over the image data and/or over the enhanced image data. In either case, the parameter $\omega$ can be derived from these upper thresholds and employed with EQUATION 2.

As the CT systems have a limited spatial resolution, the algorithm has also an additional optional capability to simulate a PVE over the enhanced regions. The PVE can be simulated by applying a low pass filter over the enhanced contrast media map $CM_{map}^+$.

As briefly described above, the CNR enhancer 126 can be utilized with an interactive GUI for structure enhancement and image probing. A user can use the interactive GUI to tweak one or more of the above enhancement parameters (i.e., $\alpha$, $\beta$ and/or $\omega$/upper thresholds) to probe the images and/or to obtain a best or desired enhancement. The manual parameter tweaking can be done using the mouse, keyboard or any other user interface device.

A PWS enhancer 218 generates an enhanced PWS approximation based on the enhanced contrast media map $CM_{map}^+$. By way of example, in the illustrated embodiment, the PWS enhancer 218 sums or adds the enhanced contrast media map $CM_{map}^+$ to the PWS approximation.

An image data enhancer 220 generates the CNR enhanced image data. In this example, the image data enhancer 220 generates the CNR enhanced image data by summing or adding the complementary PWS part of the image data (determined via the subtractor 210) and the enhanced PWS approximation (determined by the PWS enhancer 218).

Note that since the enhancement is done over the PWS approximation, the enhancement does not increase the noise of the image data and does not change the noise power spectrum (NPS) or the spatial resolution. As such, the enhanced image data has the same image quality (i.e., noise, NPS, and resolution) as of the input image data. In general, as the noise level is preserved while the contrast is enhanced, the algorithm improves the CNR of the image data.

Figure 3:
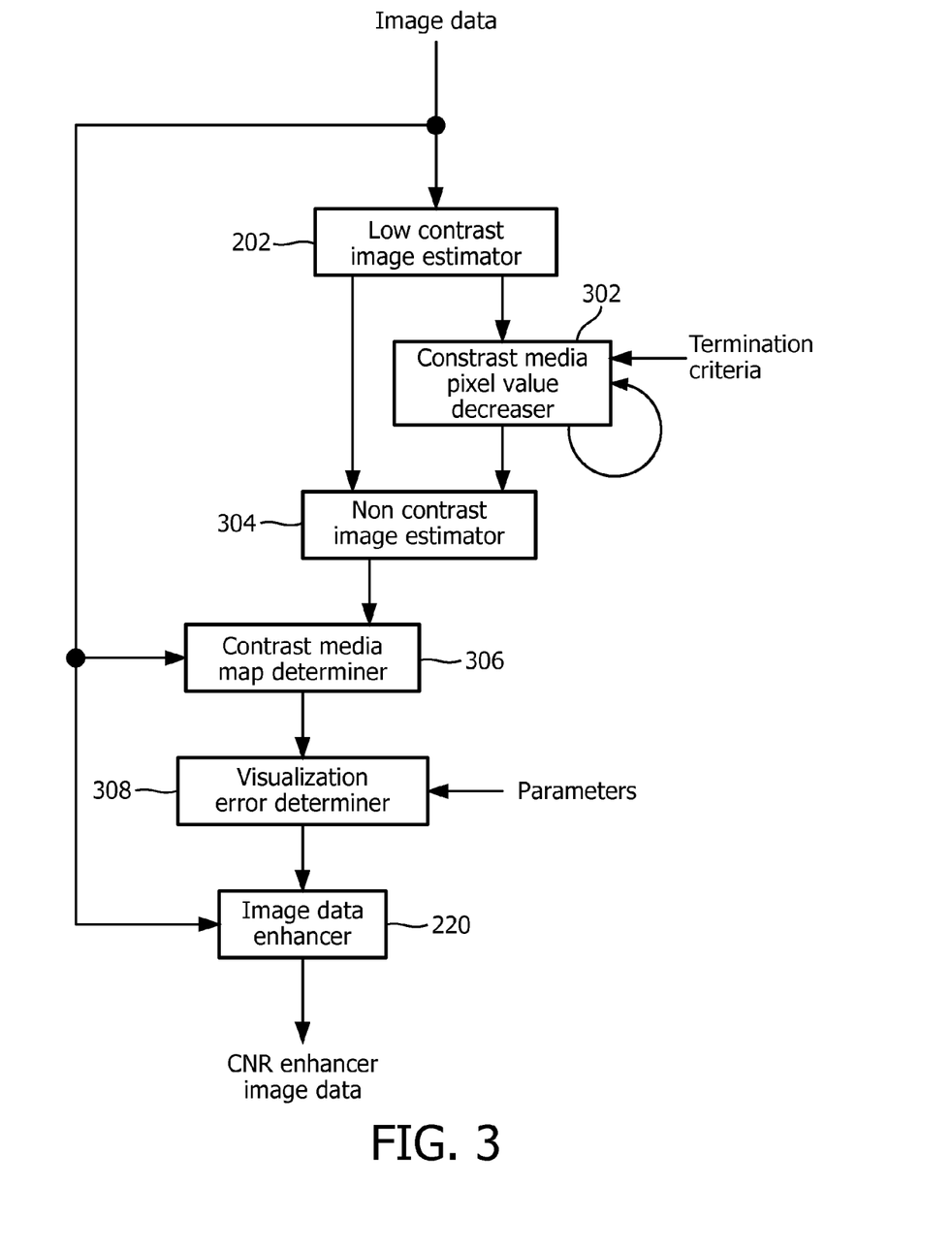
FIG. 3 shows another example of the CNR enhancer.

FIG. 3 illustrates an alternate embodiment in which the bone masking and the upper threshold bound can be obtained by an approach that utilizes the low concentration of iodine and separates it from calcium. For this example, the PWS approximation and the complementary PWS part can be determined via the low contrast image estimator 202 as described in connection with FIG. 2 above.

A contrast media pixel value decreaser 302 decreases the contrast media pixels values in the PWS approximation towards a predetermined reference soft tissue value with minimal change to the bone and calcium values. In the illustrated embodiment, the contrast media pixel value decreaser 302 employs an iterative approach. In one instance, the iterative approach is based on EQUATION 3:

$$I_{t+1} = I_t\left(1 - \frac{dt}{1+\left(\frac{I_t}{K}\right)^2}\right),\quad \text{EQUATION 3}$$

wherein K and dt are predefined parameters.

The termination condition can be determined by the difference between to subsequent iterations, satisfying a predefined threshold, and/or other termination criteria. A user can employ the interactive GUI to optimize the parameters by marking a region of interest (ROI) on the image data.

A non-contrast image estimator 304 estimates non-contrast image data based on the complementary PWS data and the decreased contrast media PWS approximation. In the illustrated example, the non-contrast image estimator 304 estimates the non-contrast image data by summing or adding the complementary PWS data and the decreased contrast media PWS approximation.

A contrast media map determiner 306 determines a contrast media map based on the input image data and the estimated non-contrast image data. In the illustrated example, the contrast media map determiner 306 determines the contrast media map by subtracting the estimated non-contrast image data from the input image data. This estimation is based on the fact that the soft tissue has a narrow range of the CT values, and, thus, the error of the estimation hardly affects the image data.

A visual error determiner 308 determines a visual error based on the contrast media map and various parameters such as an estimation error, an amplification, a window width, and/or other parameter(s), which can be and/or modified via the interactive GUI by a user. In the illustrated embodiment, the visual error ($E_{Visual}$) determiner 308 determines the visual error based on EQUATION 4.

$$E_{Visual} = \frac{\frac{1}{N^2}\sqrt{\sum_{x\in X}\left(I_{NC}(x) - \hat{I}_{non\text{-}contrast}(x)\right)^2}}{w}(\alpha - 1),\quad \text{EQUATION 4}$$

wherein $I_{NC}, \hat{I}_{non\text{-}contrast}$ respectively are the real and estimated non-contrast images, $\alpha$ represents the contrast media amplification factor, w represents the window width, and X represents the set of estimated pixels. In general, a typical error is generally smaller than 5%.

The image data enhancer 220 (FIG. 2) generates the CNR enhanced image data based on the input image data and the visualization error ($E_{Visual}$). In the illustrated example, the image data enhancer 220 generates the CNR enhanced image data by summing or adding the input image data and the visualization error ($E_{Visual}$).

Figure 4:
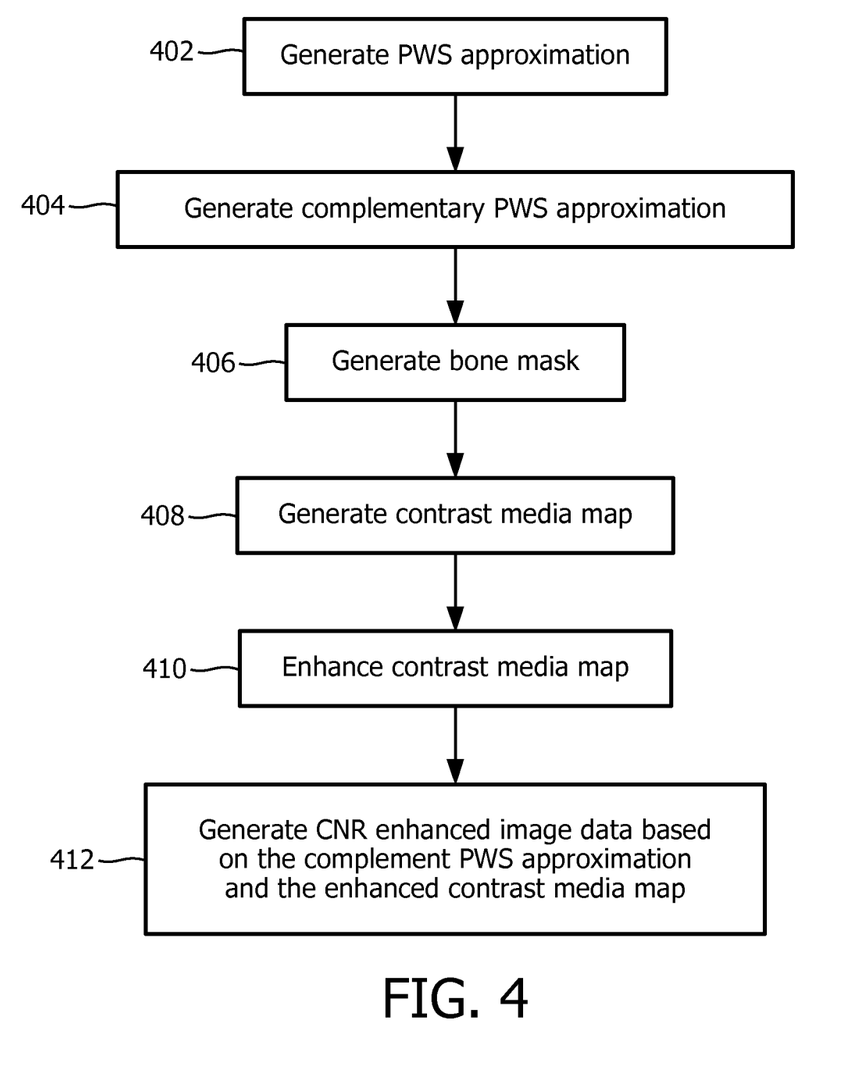
FIG. 4 illustrates a method for enhancing CNR in image data.

FIG. 4 illustrates an example method for increasing the contrast to noise ratio of image data.

At 402, a piece wise (PWS) approximation is generated based on the image data. As described herein, this may be achieved through estimating a noise model based on the image data, determining a local structure estimate based on the noise model, and determining the PWS approximation based on the local structure estimate and optional a new noise model generated bases on the local structure estimate.

At 404, data complementary to the piece wise (PWS) approximation is generated. As described herein, this can be achieved by subtracting the PWS approximation from the image data.

At 406, a bone mask is generated based on the image data. As described herein, this can be achieved via segmenting bone structure from the image data.

At 408, a contrast media map is estimated based on the PWS approximation and the bone mask. As described herein, this can be achieved through a comparison of the PWS approximation to a reference value that represents a typical soft tissue value in the image data, wherein the bone mask is utilized to prevent a fault estimate of contrast media within bone regions.

At 410, an enhanced contrast media map is estimated based on the contrast media map and various configurable parameters. As described herein, examples of such parameters include an enhancement multiplier parameter ($\alpha$), a range width of the enhancement parameter ($\omega$), and a decreasing enhancement parameter ($\beta$).

At 412, CNR enhanced image data is generated based on complement PWS data and the enhanced contrast media map. As described herein, this can be achieved through summing or adding the complement PWS data and the enhanced contrast media map.

It is to be appreciated that the ordering of the above acts is not limiting. As such, other orderings are contemplated herein. In addition, one or more acts may be omitted and/or one or more additional acts may be included.

Figure 5:
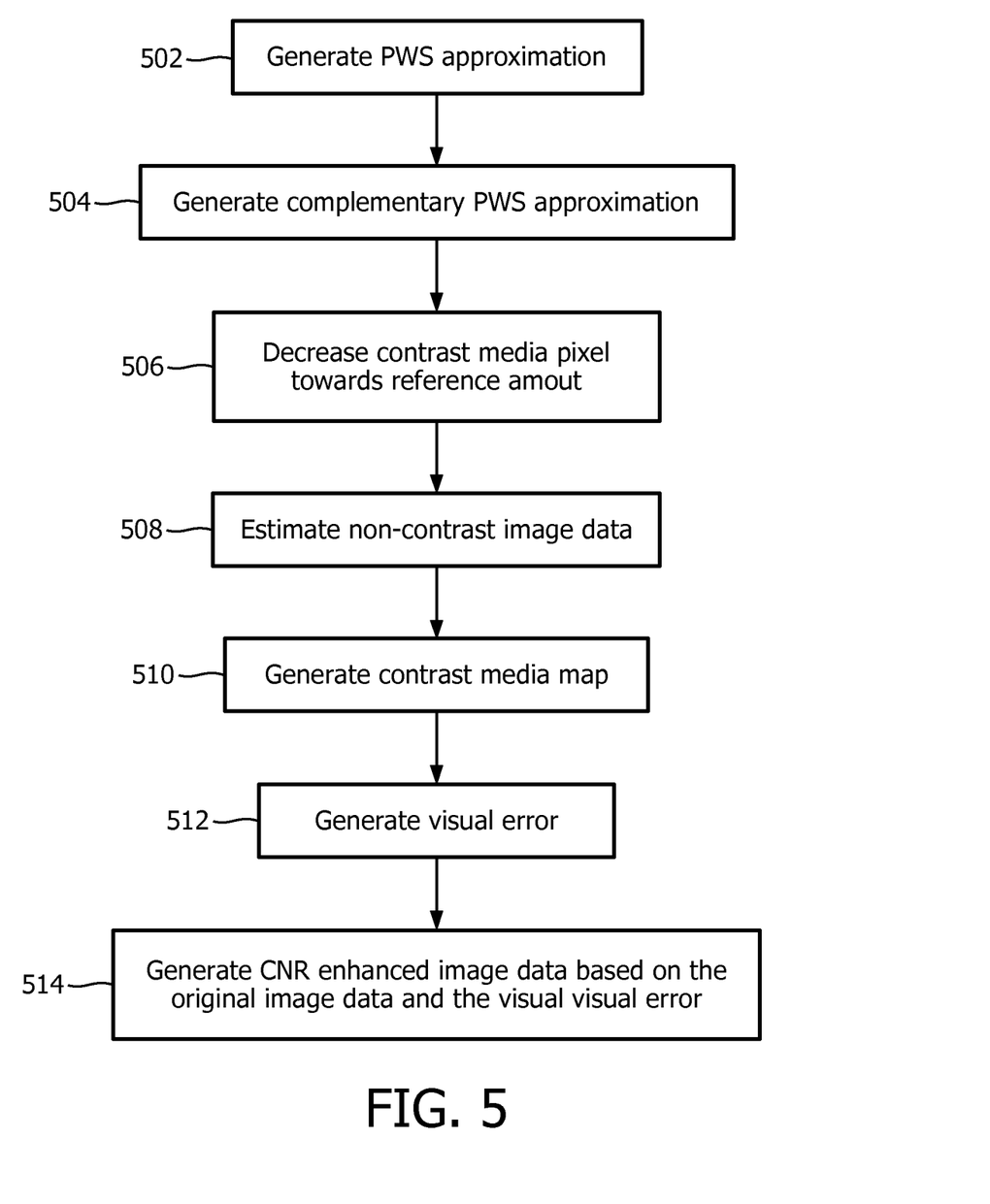
FIG. 5 illustrates another method for enhancing CNR in image data.

FIG. 5 illustrates an example method for increasing the contrast to noise ratio of image data.

At 502, a piece wise (PWS) approximation is generated based on the image data. As described herein, the may be achieved through estimating a noise model based on the image data, determining a local structure estimate based on the noise model, and determining the PWS approximation based on the local structure estimate and optional a new noise model generated bases on the local structure estimate.

At 504, data complementary to the piece wise (PWS) approximation is generated. As described herein, this can be achieved by subtracting the PWS approximation from the image data.

At 506, contrast media pixel values are decreased toward a reference soft tissue value with minimal change to bone and calcium values. As described herein, this can be achieved through an iterative process using various stopping criteria.

At 508, non-contrast image data is estimated based on the complementary PWS data and the decreased contrast media pixel data. As described herein, this can be achieved through summing or adding the complementary PWS data and the decreased contrast media pixel data.

At 510, a contrast media map is estimated based on the estimated non-contrast image data and the original image data. As described herein, this can be achieved by subtracting the estimated non-contrast image data from the original image data.

At 512, a visual error is generated based on the contrast media map and various parameters. Examples of such parameters include the contrast media amplification factor ($\alpha$), the window width (w), and a set of estimated pixels (X).

At 514, CNR enhanced image data is generated based on the original image data and the visual error. In the illustrated example, the contrast enhanced image data is generated through summing or adding the original image data and the visual error.

It is to be appreciated that the ordering of the above acts is not limiting. As such, other orderings are contemplated herein. In addition, one or more acts may be omitted and/or one or more additional acts may be included.

The above may be implemented by way of computer readable instructions, which when executed by a computer processor(s), cause the processor(s) to carry out the described acts. In such a case, the instructions are stored in a computer readable storage medium associated with or otherwise accessible to the relevant computer. The acts need not be performed concurrently with data acquisition.

It is to be appreciated that the low contrast approximator 208 can also be used as a general noise edge preserving removal algorithm. That is, the approximator 208 can be by itself as a very effective and accurate noise removal algorithm as, for example, it has very favorable capability of preserving very accurately the low contrast structures, i.e., preserving the HU/intensity of low contrast regions.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A method, comprising:
    enhancing a contrast to noise ratio (CNR) of image data, generating CNR enhanced image data, wherein the CNR enhanced image data has a substantially same image quality as the image data, the enhancing including:
        determining a piece wise approximation of the image data;
        determining a bone mask based on the image data:
        determining a contrast media map based on the piece wise approximation and the bone mask:
        determining an enhanced contrast media map based on the contrast media map and one or more parameters;
        determining data complementary to the piece wise approximation of the image data based on the image data and the piece wise approximation; and
        determining the CNR enhanced image data based on the enhanced contrast media map and the data complementary to the piece wise approximation.

2. The method of claim 1, wherein enhancing the CNR does not increase a noise level of the image data, a noise power spectrum of the image data, and a spatial resolution of the image data.

3. The method of claim 1, wherein the image data corresponds to a contrast enhanced imaging procedure in which a volume of contrast media is reduced from a predetermined prescribed volume of contrast media, and the enhancing of the CNR of the image data compensates for the reduced volume of contrast media such that the image quality of the CNR enhanced image data is substantially the same as an image quality of for the predetermined prescribed volume of contrast media.

4. The method of claim 3, wherein an amount of the reduction of the volume of contrast media is based on an input indicative of a user volume of interest.

5. The method of claim 1, wherein the image data corresponds to a contrast enhanced imaging procedure in which contrast media timing is missed, and the enhancing of the CNR of the image data compensates for reduced volume of contrast media such that the image quality of the CNR enhanced image data is substantially the same as an image quality of not missing the contrast media timing.

6. The method of claim 1, wherein the image data corresponds to a contrast enhanced imaging procedure in which CNR of soft tissue is enhanced to differentiate between soft tissue having similar contrast characteristics.

7. The method of claim 1, wherein the image data corresponds to a contrast enhanced imaging procedure in which CNR of brain tissue is enhanced to differentiate between gray and white matter.

8. The method of claim 1, wherein an amount of the reduction of the volume of contrast media is selectively varied until a visualization of interest is obtained.

9. The method of claim 1, determining the piece wise approximation, comprising:
    estimating a noise model based of the image data;
    determining a local structure estimate based on the noise model; and
    determining the piece wise approximation based on the local structure estimate and the noise model.

10. The method of claim 9, determining the piece wise approximation based on the local structure estimate and a new noise model generated based on the local structure estimate.

11. The method of claim 1, wherein the one or more parameters include at least one of an enhancement multiplier parameter, a range width of the enhancement parameter, and a decreasing enhancement parameter.

12. The method of claim 1, wherein the one or more parameters are user configurable.

13. The method of claim 1, determining the CNR enhanced image data, comprising:
    summing the data complementary to the piece wise approximation and the enhanced contrast media map.

14. The method of claim 1, determining the data complementary to the piece wise approximation, comprising:
    subtracting the piece wise approximation from the image data.

15. A method, comprising:
    enhancing the CNR, comprising:
        enhancing a contrast to noise ratio (CNR) of image data, generating CNR enhanced image data, wherein the CNR enhanced image data has a substantially same image quality as the image data, the enhancing including;
        determining a piece wise approximation of the image data:
        determining data complementary to the piece wise approximation based on the image data and the piece wise approximation;
        decreasing contrast media pixel values of the piece wise approximation toward a reference soft tissue value;
        determining non-contrast image data based on the complementary data and the decreased contrast media pixel data;
        determining a contrast media map based on the estimated non-contrast image data and the original image data;
        determining a visual error based on the contrast media map and various parameters; and
        determining the CNR enhanced image data based on the visual error and image date.

16. The method of claim 15, determining the non-contrast image data, comprising:
    summing the complementary data and the decreased contrast media pixel data.

17. The method of claim 15, determining the contrast media map, comprising:
subtracting the estimated non-contrast image data from the image data.

18. The method of claim 15, wherein the various parameters include one or more of contrast media amplification factor, a window width, and a set of estimated pixels.

19. The method of claim 15, wherein at least one of the various parameters is user configurable.

20. A computing system, comprising:
a computer readable storage medium encoded with computer readable instructions for enhancing a contrast to noise ratio (CNR) of image data; and
one or more processors, which, when executing the computer readable instructions, causes the computing system to enhance the CNR of the image data by determining a piece wise approximation of the image data, data complementary to the piece wise approximation of the image data, a bone mask based on the image data, a contrast media map based on the piece wise approximation of the image data and the bone mask, an enhanced contrast media map based on the contrast media map, and the CNR enhanced data based on the data complementary to the piece wise approximation and the enhanced contrast media map.

21. The system of claim 20, wherein the instructions have high sensitivity to low contrast structures, preserving Hounsfield Unit per intensity values of low contrast regions.

22. The system of claim 20, wherein the instructions enhance CNR while preserving overall image quality.

23. The system of claim 20, wherein the one or more parameters are user selectable, and a change in at least one of the parameters via a user results in a real-time update of the CNR enhancement of the image data.

24. The system of claim 20, the one or more processors enhance the CNR by:
decreasing contrast media pixel values of the piece wise approximation of the image data toward a reference soft tissue value;
determining non-contrast image data based on the data complementary to the piece wise approximation of the image data and the decreased contrast media pixel data;
determining the contrast media map based on the estimated non-contrast image data and the original image data;
determining a visual error based on the contrast media map and various parameters; and
determining the CNR enhanced image data based on the visual error and image data.

25. The system of claim 20, wherein the one or more processors simulate a partial volume effect over the enhanced regions by applying a low pass filter over the enhancement map.

* * * * *